United States Patent [19]

McCulley et al.

[11] Patent Number: 5,202,726
[45] Date of Patent: Apr. 13, 1993

[54] FACILITATION OF THE DIAGNOSIS OF MALFUNCTIONS AND SET-UP OF A REPRODUCTION MACHINE

[75] Inventors: DeWayne L. McCulley, Penfield; C. Nelson Bright, Walworth; Lawrence E. Peck, Macedon; Alan B. Cottrill, Fairport; Jocelyn R. Basley; Kris A. Schneider, both of Rochester; Frederick J. Morton, Williamson, all of N.Y.

[73] Assignee: Xerox Corporation, Stamford, Conn.

[21] Appl. No.: 809,112

[22] Filed: Dec. 18, 1991

[51] Int. Cl.$^5$ .................. G03G 15/00; G06F 11/00
[52] U.S. Cl. .................. 355/206; 355/207; 371/15.1; 364/188
[58] Field of Search .................. 355/204–208, 355/209; 371/15.1, 16.4, 29.1; 364/788

[56] References Cited

U.S. PATENT DOCUMENTS

| | | |
|---|---|---|
| 3,575,589 | 4/1971 | Neema et al. . |
| 4,742,483 | 5/1988 | Morrell . |
| 4,810,958 | 3/1989 | Mogi et al. . |
| 4,866,712 | 9/1989 | Chao . |
| 4,975,848 | 12/1990 | Abe et al. . |
| 5,010,551 | 4/1991 | Goldsmith et al. ........... 371/16.4 |
| 5,018,143 | 5/1991 | Platteter et al. ........... 371/16.4 |
| 5,081,595 | 1/1992 | Moreno et al. ........... 395/111 |

Primary Examiner—Joan H. Pendegrass
Attorney, Agent, or Firm—Oliff & Berridge

[57] ABSTRACT

A reproduction machine having a user interface facilitates the diagnosis of malfunctions in the machine and set-up of the machine. The user interface includes a display used in a plurality of servicing tasks. A plurality of servicing procedures can be performed on the machine, each of the servicing procedures being displayable. Upon selection of each servicing procedure, the identity of the servicing procedure is retained in storage. The display provides an indication of all of the servicing procedures performed on the machine. Diagrams of machine components and parameters of machine components can be provided via the display to enable identification of defective components. The interface is provided with a plurality of additional features used during servicing of the machine to provide guidance to a service representatitve performing the required servicing task.

26 Claims, 17 Drawing Sheets

FACILITATION OF THE DIAGNOSIS OF MALFUNCTIONS AND SET-UP OF A REPRODUCTION MACHINE

BACKGROUND OF THE INVENTION

1. Field of the Invention

The present invention relates to the servicing of a reproduction machine and, more particularly, to the diagnosis of malfunctions of the reproduction machine and to set-up of the reproduction machine.

2. Description of the Related Art

As reproduction machines such as copiers and printers become more complex and versatile in the jobs which they can perform, the servicing of such reproduction machines also becomes more complex. These reproduction machines include numerous subcomponents, each of which contributes to some operation of the reproduction machine. In accordance with the types of operations preferably performed by a particular reproduction machine, the initial set-up of the machine varies. Accordingly, identical reproduction machines can initially be provided with widely varying set-up features.

Due to the complexity of the reproduction machine, numerous tasks are required of a service representative as machine malfunctions are diagnosed and corrected. Troubleshooting can involve numerous servicing procedures to isolate malfunctioning machine subcomponents. Service representatives must, therefore, keep track of servicing procedures previously performed in order to isolate the source of any machine malfunction.

The related art has provided systems which facilitate the determination of any appropriate procedure for recovering from system malfunctions and which also facilitate performance of appropriate recovery procedures.

U.S. Pat. No. 3,575,589 to Neema et al. discloses an error recovery apparatus and method wherein various types of errors are classified into groups, these groups corresponding to various recovery procedures. When an error occurs, a possible recovery procedure is indicated.

U.S. Pat. No. 4,866,712 to Chao discloses a method and apparatus for fault recovery wherein an error table and an action table control the parameters of a system. Each recovery procedure may be differently weighed. When an error occurs, it is automatically fixed or a higher level error recovery procedure is performed.

U.S. Pat. No. 4,975,848 to Abe et al. discloses a diagnostic system for a motor vehicle wherein a code is assigned to each control system. Each code has an error recovery procedure which is used to correct faults and errors in the particular control system designated by the code. The recovery procedures are stored on a ROM or memory cartridge.

U.S. Pat. No. 4,742,483 to Morrell discloses a laser printer maintenance system wherein various maintenance programs are stored on different font cartridges. An operator can select from a plurality of maintenance programs by following system prompts. A display device is used to select each text and display results.

U.S. Pat. No. 4,810,958 to Mogi et al. discloses an apparatus and method for testing various electronic equipment wherein a computer tests a particular piece of equipment according to the software package of the equipment. Each software package has instructions and data relevant to the particular piece of equipment. Results of the test are displayed for operator viewing.

While the related art provides systems which enable determination of appropriate recovery procedures, the related art fails to provide an interface to be utilized by a service representative to facilitate set-up of a reproduction machine and/or diagnosis of the source of malfunctions of the machine. The related art systems further lack features enabling a service representative to keep track of previously performed troubleshooting operations.

OBJECTIONS AND SUMMARY OF THE INVENTION

An object of the present invention is to facilitate set-up of a reproduction machine by a service representative.

Another object of the present invention is to facilitate diagnosis of the source of malfunctions in a reproduction machine.

Another object of the present invention is to facilitate the determination of the location and makeup of components of a reproduction machine.

Another object of the present invention is to enable servicing of a reproduction machine in a safe manner.

A further object of the present invention is to facilitate servicing of a reproduction machine without requiring a service representative to keep track of the servicing procedures performed.

To achieve the foregoing and other objects and to overcome the shortcomings discussed above, a reproduction machine having a user interface is provided which facilitates the diagnosis of malfunctions in the machine and set-up of the machine by a service representative. The user interface includes a display used in a plurality of servicing tasks.

A plurality of servicing procedures can be performed on the machine, each of the servicing procedures being displayable. Upon selection of each servicing procedure, the identity of the servicing procedure is retained in storage. The display provides an indication of all of the servicing procedures which have been performed on the machine. Diagrams of machine components and indications of parameters of machine components can be provided via the display to enable identification of defective components. The interface is provided with a plurality of additional features used during servicing of the machine to provide guidance to a service representative performing the required servicing task.

BRIEF DESCRIPTION OF THE DRAWINGS

The invention will be described in detail with reference to the following drawings in which like reference numerals refer to like elements, and wherein.

DETAILED DESCRIPTION OF PREFERRED EMBODIMENT

Figure 1:
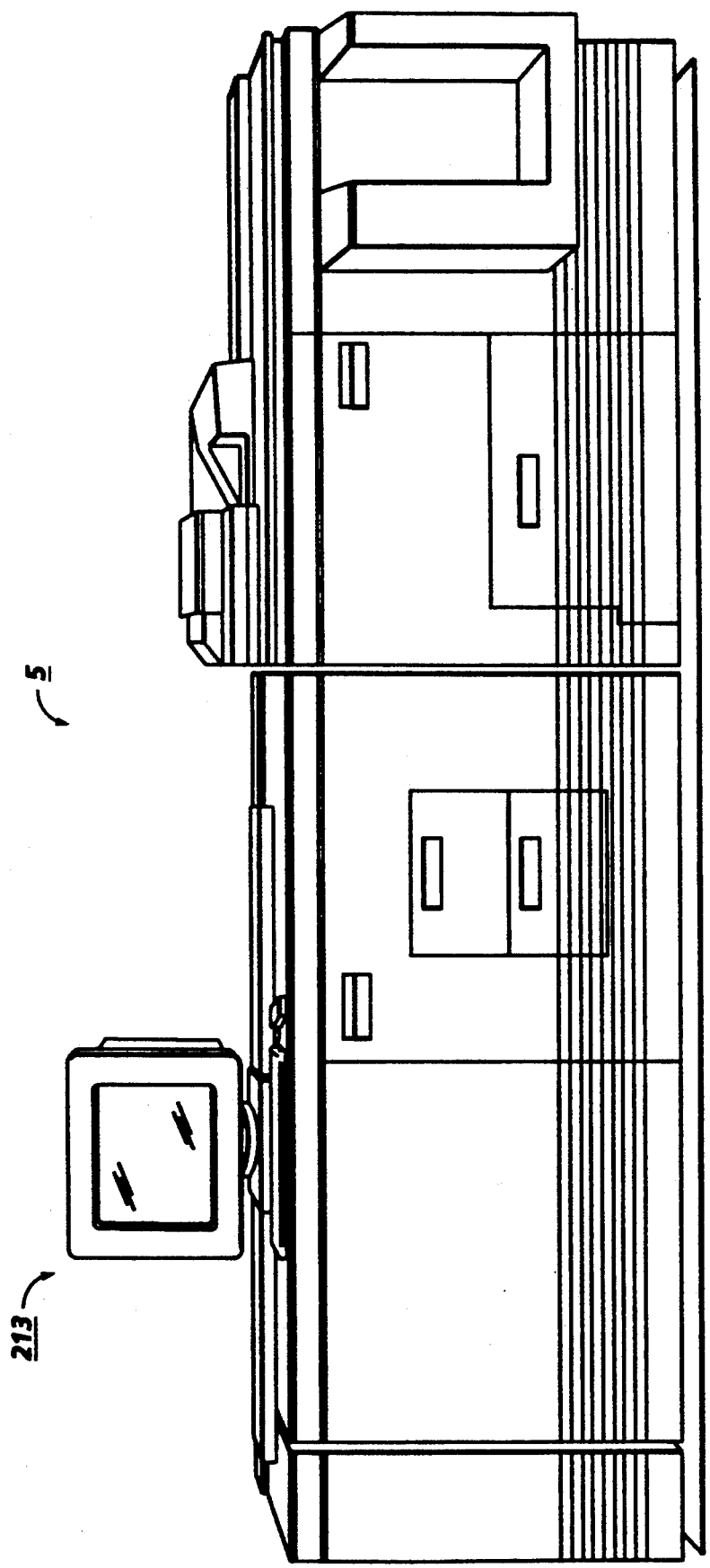
FIG. 1 is an isometric view of an illustrative reproduction machine incorporating a user interface in accordance with the present invention.

Referring now to the drawings and more particularly to FIG. 1 thereof, a reproduction machine 5 according to the present invention comprises a plurality of programmable components and subsystems which cooperate to carry out the copying or printing operation which is programmed through a user interface 213 of the present invention. It will become evident from the following discussion that the user interface 213 of the present invention can be employed in a wide variety of devices and is not specifically limited in its application to the particular embodiment depicted herein.

Figure 2:
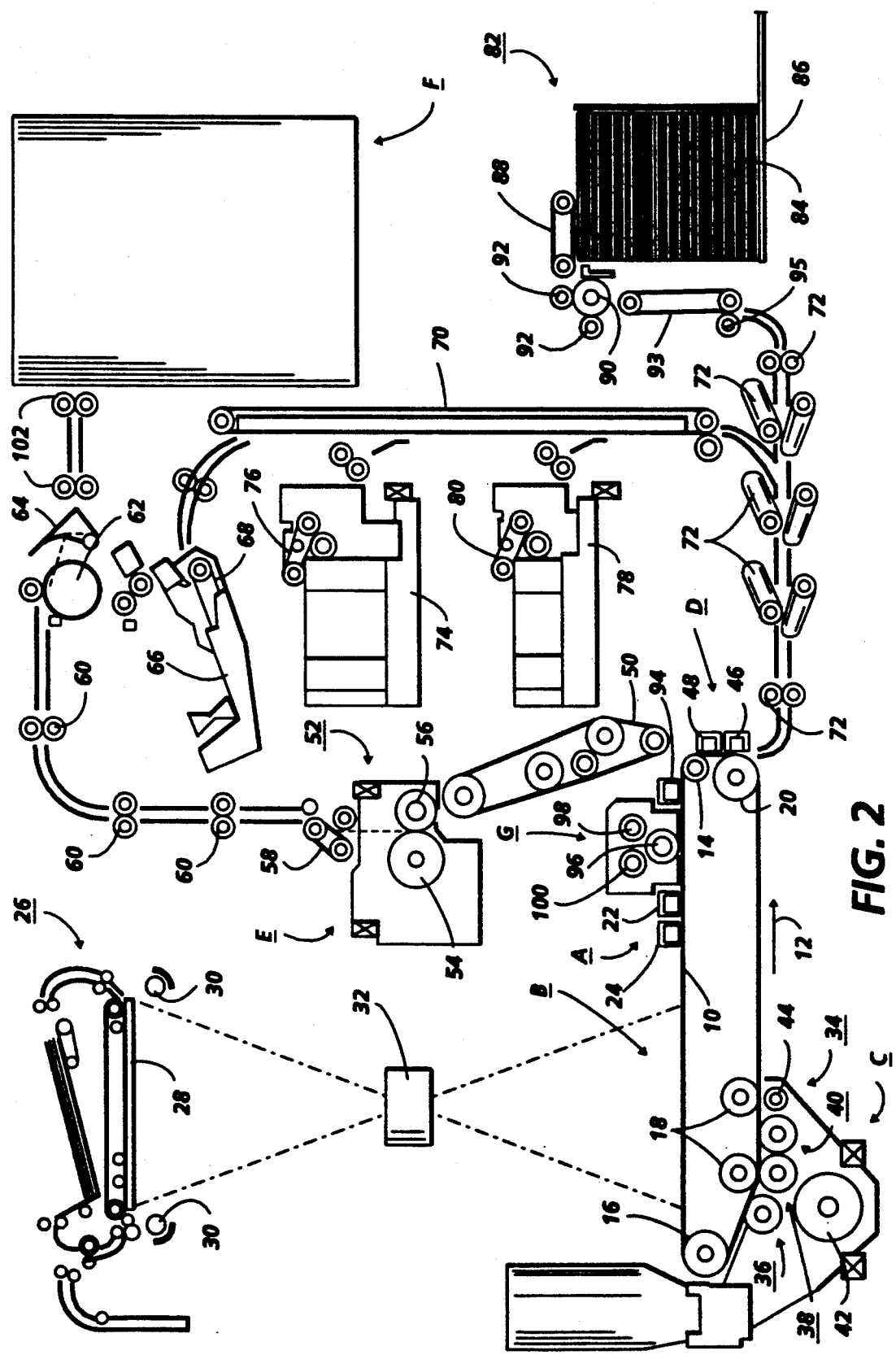
FIG. 2 is a schematic elevational view depicting various operating components and subsystems of the reproduction machine shown in FIG. 1.
Figure 3:
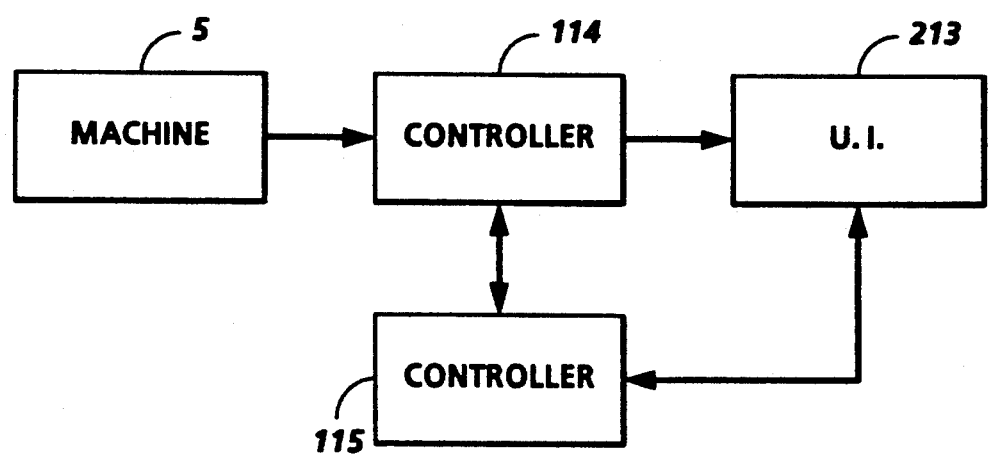
FIG. 3 is a block diagram of the operating control system and memory for the reproduction machine shown in FIG. 1.

As illustrated in FIG. 2, reproduction machine 5 employs a photoconductive belt 10. Photoconductive belt 10 is entrained about a stripping roller 14, a tensioning roller 16, idler rollers 18 and a drive roller 20. Drive roller 20 is rotated by a motor coupled thereto via a suitable means such as a belt drive. As drive roller 20 rotates, photoconductive belt 10 is advanced in the direction of arrow 12 through various processing stations disposed about the path of movement of photoconductive belt 10.

Initially, the photoconductive surface of photoconductive belt 10 passes through a charging station A where two corona generating devices, indicated generally by the reference numerals 22 and 24, charge photoconductive belt 10 to a relative high, substantially uniform potential. Next, the charged photoconductive belt 10 is advanced through an imaging station B. At imaging station B, a document handling unit 26 sequentially feeds documents from a stack of documents in a document stacking and holding tray into registered position on platen 28. A pair of Xenon flash lamps 30 mounted in an optics cavity illuminate the document on platen 28, light rays reflected from the document being focused by lens 32 onto photoconductive belt 10 to expose and record an electrostatic latent image on photoconductive belt 10. The electrostatic latent image corresponds to the informational areas contained within the document currently on platen 28. After imaging, the document is returned to the document tray, via a simplex path when either a simplex copy or the first pass of a duplex copy is being made or via a duplex path when a duplex copy is being made.

The electrostatic latent image recorded on photoconductive belt is developed at development station C by a magnetic brush developer unit 34 having three developer rolls 36, 38 and 40. A paddle wheel 42 picks up developer material and delivers the developer material to developer rolls 36 and 38. Developer roll 40 is a clean-up roll while a magnetic roll 44 is provided to remove any carrier granules adhering to photoconductive belt 10.

Following development at development station C, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder is attracted from the photoconductive belt 10 to the copy sheet. After transfer, corona generating device 48 charges the copy sheet to the opposite polarity to detach the copy sheet from photoconductive belt 10.

Following transfer at transfer station D, a conveyor 50 advances the copy sheet bearing the transferred image to fusing station E where a fuser assembly, indicated generally by reference numeral 52, permanently affixes the toner powder image to the copy sheet. Preferably, fuser assembly 52 includes a heated fuser roller 54 and a pressure roller 56 causing the powder image on the copy sheet to contact fuser roller 54.

After fusing, the copy sheet is fed through a decurler 58 to remove any curl. Forwarding rollers 60 then advance the sheet via duplex turn rolls 62 to gate 64 which guides the sheet to either finishing station F or to duplex tray 66, duplex tray 66 providing an intermediate or buffer storage for sheets which have been printed on one side and on which an image will subsequently be printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from an auxiliary tray 78 by sheet feeder 80. Sheet feeders 76 and 80 are friction retard feeders utilizing a feed belt and take-away rolls to advance successive copy sheets to transport 70 which advances the sheets to rolls 72 and, subsequently, to transfer station D.

A high capacity feeder 82 is the primary source of copy sheets. Tray 84 of high capacity feeder 82, which is supported on an elevator 86 for up and down movement, has a vacuum feed belt 88 to feed successive uppermost sheets from the stack of sheets in tray 84 to a take-away drive roll 90 and idler rolls 92. Take-away roll 90 and idler rolls 92 guide the sheet onto transport 93 which, in cooperation with idler roll 95 and rolls 72, move the sheet to transfer station D.

After transfer station D, photoconductive belt 10 passes beneath corona generating device 94 which charges any residual toner particles remaining on photoconductive belt 10 to the proper polarity. Thereafter, a precharge erase lamp (not shown) located in photoconductive belt 10, discharges the photoconductive belt in preparation for the next charging cycle. Residual particles are removed from photoconductive belt 10 at cleaning station G by an electrically biased cleaner brush 96 and two detoning rolls 96 and 100.

The various functions of reproduction machine 5 are regulated by a controller 114 which preferably comprises one or more programmable microprocessors. The controller provides a comparison count of copy sheets, the number of documents being recirculated, the number of copy sheets selected by the operator, time delays, jam corrections, etc. Programming and operating control over reproduction machine 5 is accomplished through user interface 213. Operating and control information, job programming instructions, servicing instructions, etc., are stored in a suitable memory 115 which includes both ROM and RAM memory types, the latter being also used to retain jobs programmed through user interface 213. While a single memory 115 is illustrated, it is understood that memory 115 may also comprise a series of discrete memories. Conventional sheet path sensors or switches may be utilized to keep track of the position of documents and copy sheets. In addition, the controller 114 regulates the various positions of the gates depending upon the mode of operation selected.

Figure 4A:
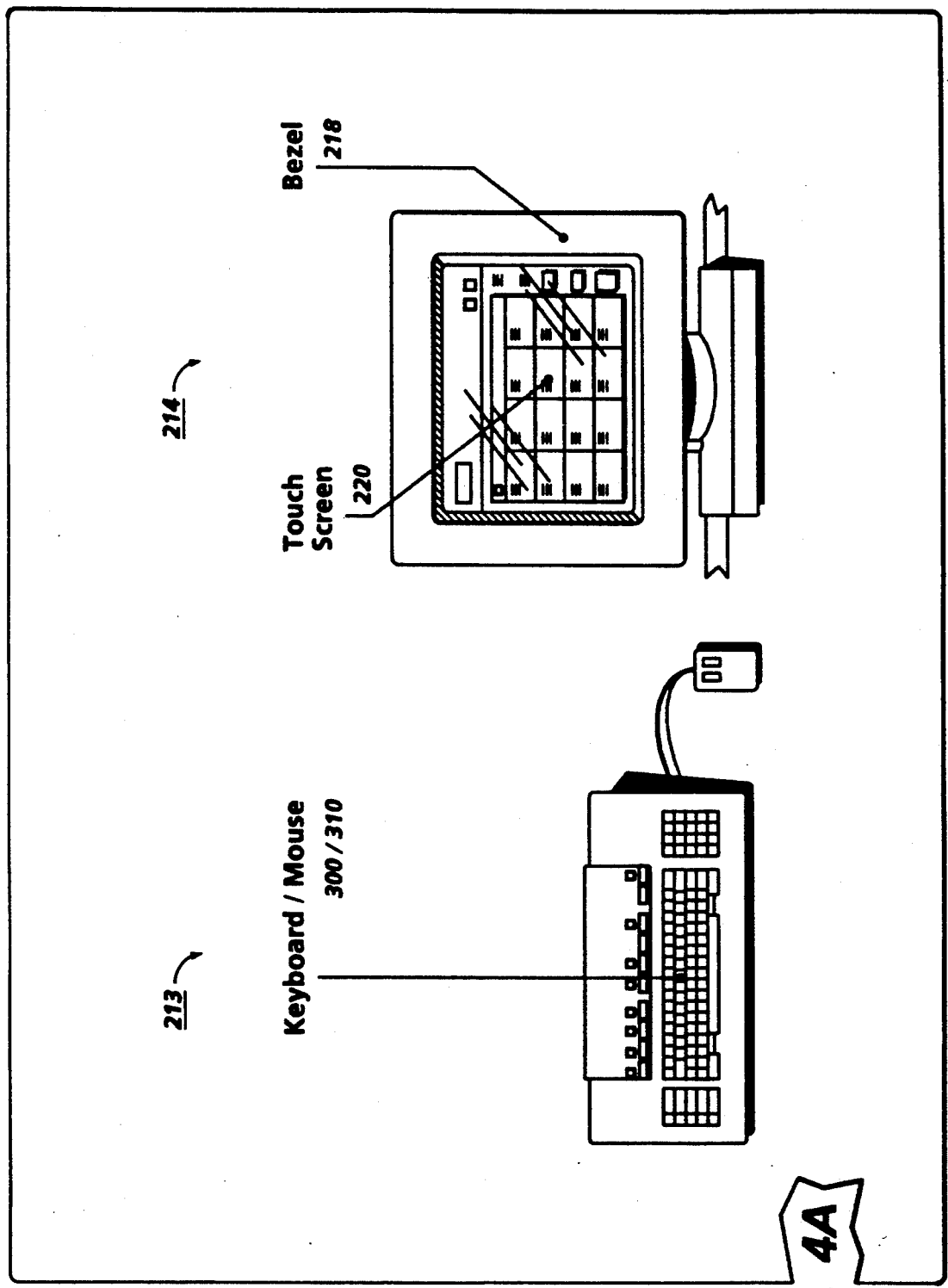
FIGS. 4A–4C are front views, respectively, of the user interface, scanner and printer of the reproduction machine shown in FIG. 1.

Referring to FIG. 4A, there is shown a touch monitor 214 for the user interface 213 of the present invention. Touch monitor 214 provides an operator user interface with soft touch control buttons enabling communication between an operator and reproduction machine 5. Touch monitor 214 has a peripheral bezel 218 thereabout. Bezel 218 frames a rectangular video display screen 220 on which soft touch buttons in the form of icons or pictograms and messages are displayed.

Figure 4B:
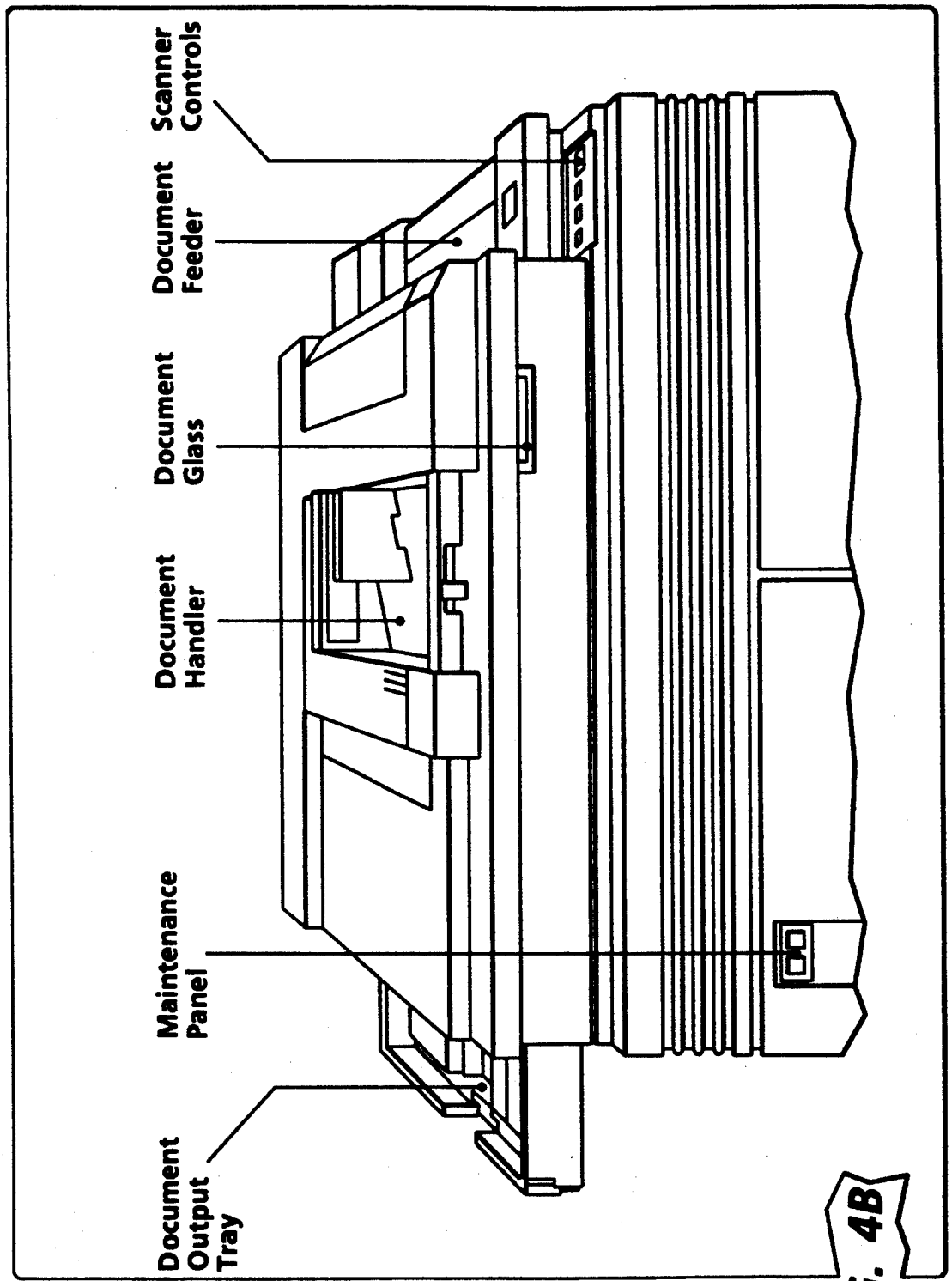
Figure 4C:
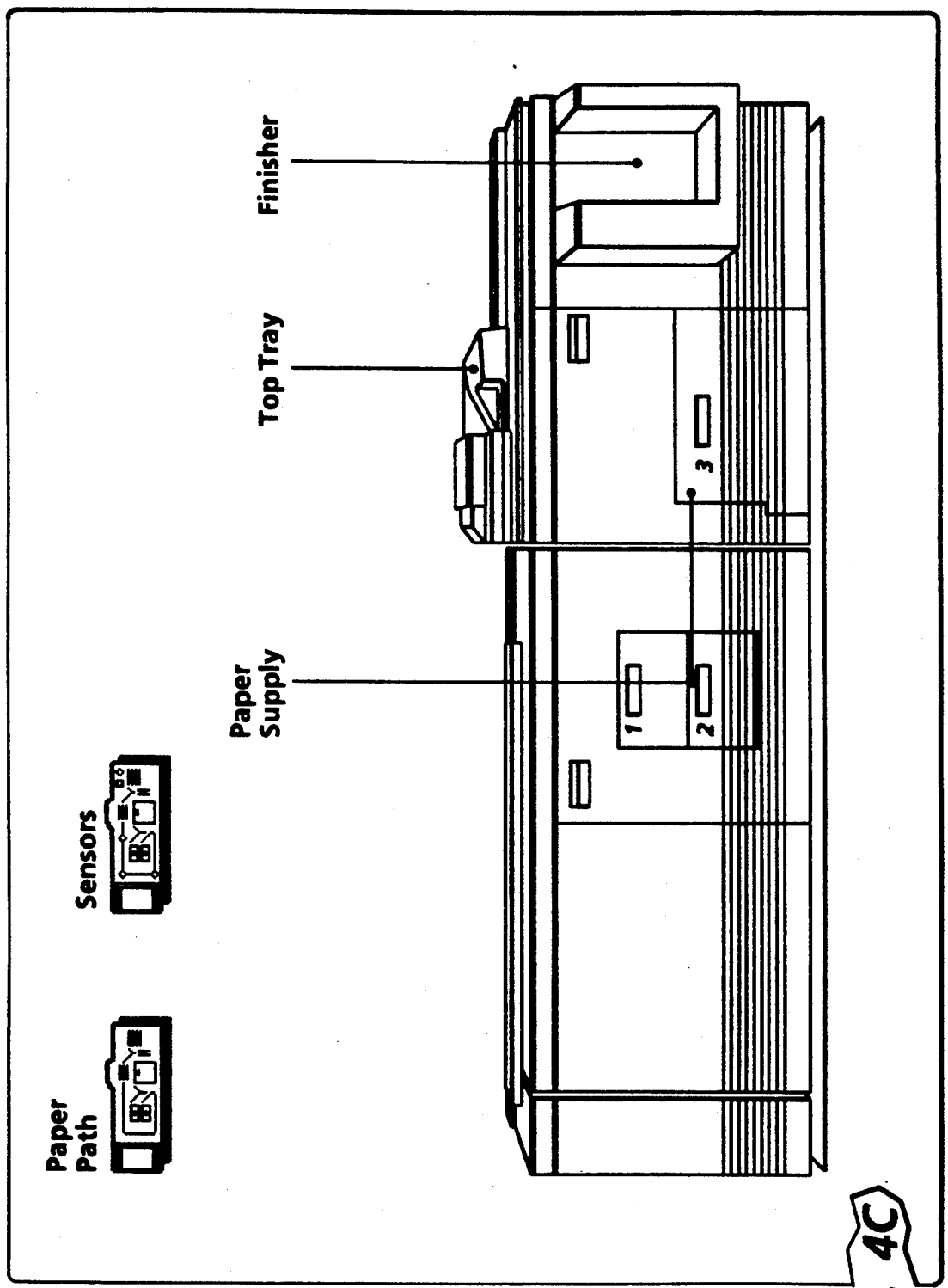

The scanner and printer of reproduction machine 5 are illustrated in FIGS. 4B and 4C, respectively.

Figure 5:
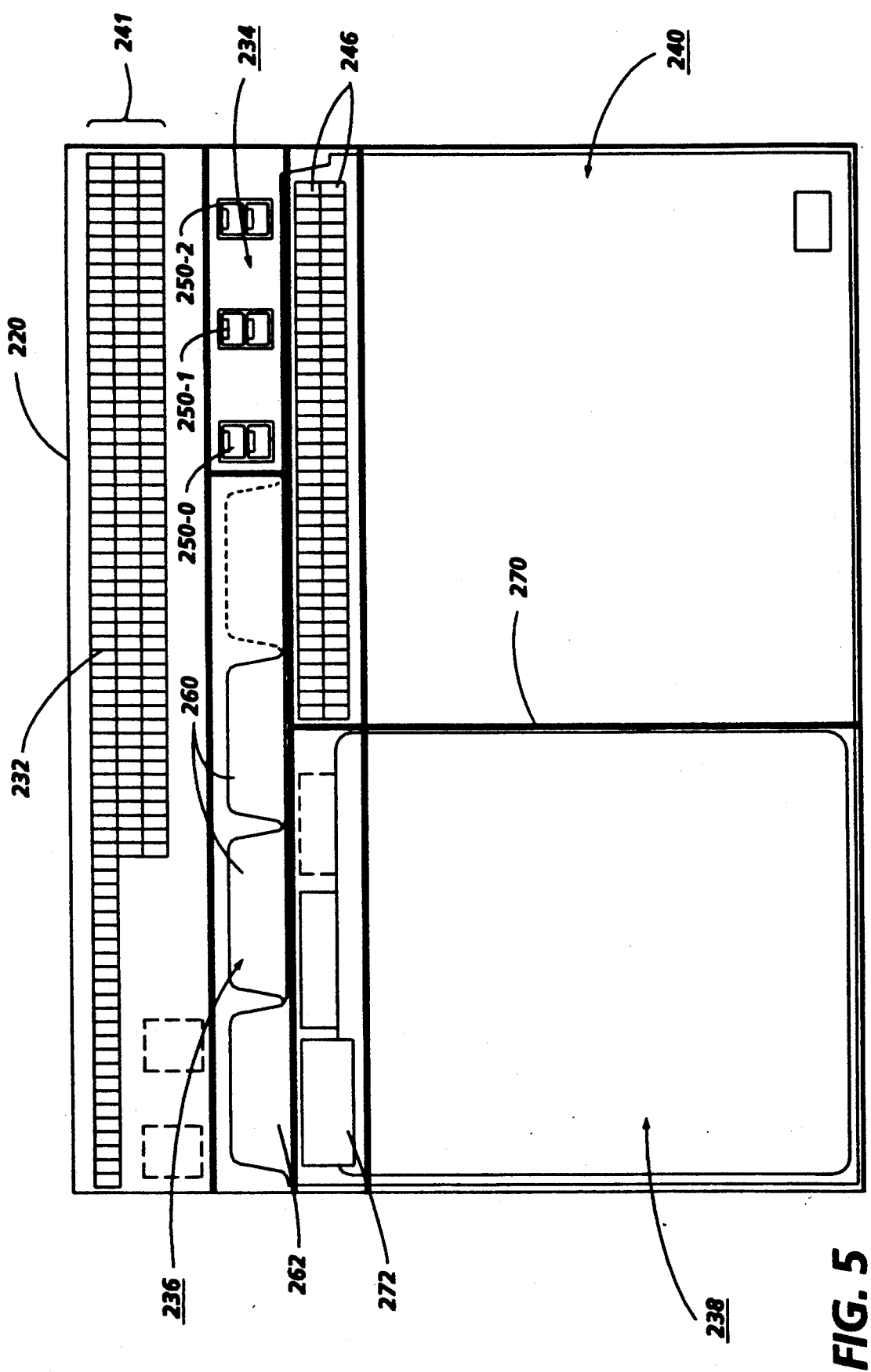
FIG. 5 is a front view of a display of a touch screen according to the present invention.

Referring now to FIG. 5, for user interface purposes, screen 220 of monitor 214 is separated into five basic display areas, identified as a message area 232, a dialog mode selection area 234, a dialog pathway selection area 236, a score card selection area 238 and a work selection area 240. Available dialogs comprise a set of frames providing a certain level of technical support to an operator. Appropriate dialogs are chosen by interaction via the user interface 213.

Message area 232 comprises three lines 241 located at the top of screen 220. Two programming conflict message lines 246 are provided in work selection area 240. The dialog mode selection area 234 comprises an active area containing certain top-level dialog mode controls available to the operator. The mode controls are soft touch buttons 250-0, 250-1, and 250-2 in the form of icons representing file cabinets located on the right side of the screen 220 directly below message area 232.

The dialog pathway selection area 236 and the score card 238 basically simulate a card with a card filing system with primary dialog file folders 260 and secondary file cards, the latter being referred to as score cards 270. Score cards 270 provide additional programming pathway options. File folders 260 and score cards 270 are arranged in overlaying relation, one in front of the other. The dialog pathway file folders 260, which are located beneath message area 232 and which extend up into the dialog mode area 234, each have an outwardly projecting touch tab 262 along with the top edge thereof identifying the dialog pathway represented by the folder. For purposes of the present invention, a file folder SERVICE will be described in greater detail hereinafter. To allow the file folders 260 to be distinguished from one another without the need to reshuffle the folders, it is desired to display a folder hidden behind the folder currently displayed, each tab 262 being offset from the other so that tabs 262 are always visible no matter what folder is displayed.

Score card selection area 238 appears in the lower left corner of screen 220 beneath dialog selection area 234 and extends to the border of work selection area 240. Score card selection area 238 contains a file of score cards 270 which present the features (first level program selections) available with each of the dialog pathway file folders 260. Two or three score cards 270 are typically provided, depending on the dialog pathway file folder 260 selected. Score cards 270 each comprise a relatively small file card arranged in overlaying relation to one another so as to simulate a second but smaller card file. Each score card 270 has a touch tab 272 displaying the programming pathway options available with the score card. Score card tabs 272 are also offset from one another to enable the identity of each score card to be determined no matter what its position is in the score card file. Additionally, score card tabs 272 are shaped differently from the dialog pathway file folder tabs 262 to prevent confusion.

Work selection 240 appears in the lower right portion of screen 220, work selection area 240 being beneath the dialog pathway area 236 and extending from the edge of score card selection area 238 to the right side of screen 220. The top two lines 246 of the work selection area 240 are reserved for programming conflicts and prompts with the remaining area being used for displaying the feature options (second level program selections) available with the first level program selection that is touched on the score card currently selected. The operator can thus scan and make a selection within a work area or pick another score card item.

Figure 6:
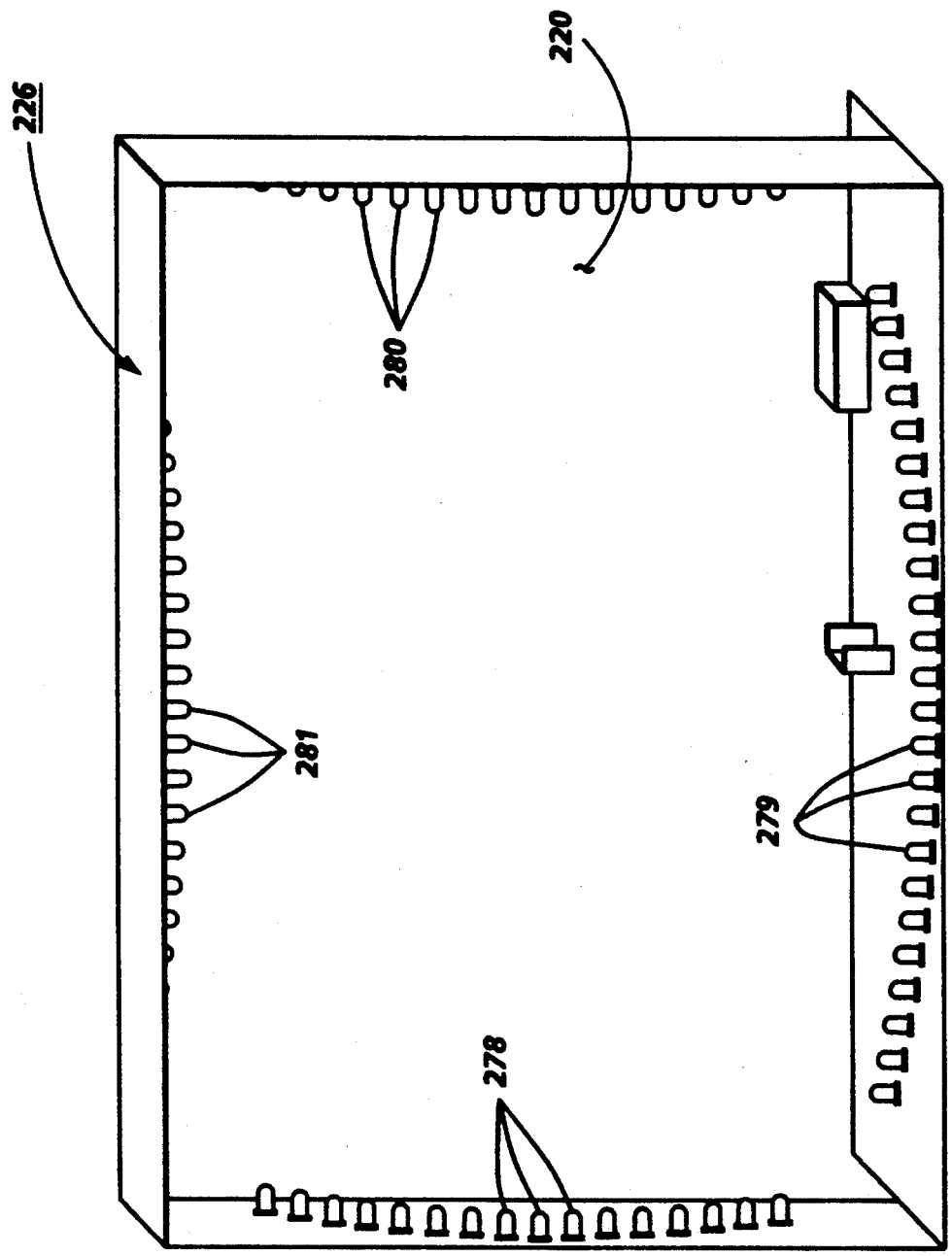
FIG. 6 is an isometric view of a touch control system bordering a display screen.

Referring to FIG. 6, mounted around the periphery of display screen 220 behind framework 218 is a touch input system 226 which provides a pattern of invisible interruptable beams across the face of the screen 220 using light emitting diodes (LED's) and photodetectors (PD's). In the examples shown, two rows of LED's 278 and 279 are provided on separate printed wiring boards (PWB's) along two adjoining sides of display screen 220. Two corresponding rows of PD's 280 and 281 are provided on PWB's positioned on the remaining two sides of the display screen 220, the number of PD's 280 and 281 being equal in number to and in opposed relationship to LED's 278 and 279. LED's 278 and 279 emit infrared rays which extend in generally parallel fashion across the face of the display screen 220 to the PD's 280 and 281 opposite thereto.

LED's 278 and 279 and PD's 280 and 281 cooperate to establish an X-Y coordinate system of invisible beams or rays across the face of the display screen 220 so that, when an operator touches a particular location on the screen 220, one or more of the beams are interrupted. Suitable control logic such as that shown in U.S. Pat. No. 4,267,443 to Carroll et al. determines the average X and Y locations of the beams that are broken to identify the particular location on screen 220 touched by the operator. While a specific touch input system 226 has been shown and described, other touch systems capable of providing an output signal indicating an area touched on a display screen may be envisioned.

In order for the soft-touch buttons (i.e., icons) on screen 220 to provide information regarding both their current selection state and the current status, a display convention is provided that will allow the operator to quickly read the display and determine current feature selections. Referring to Table 1, unselected features that are selectable are indicated by an outlined icon with a shadowed background while selected features that are selectable are indicated by a color-filled icon with a shadowed background. Unselected features that are not selectable are indicated by an outline icon without a shadowed background while selected features that are not selectable are indicated by a color-filled icon without a shadowed background.

TABLE 1

|  | SELECTABLE | NOT SELECTABLE |
|---|---|---|
| SELECTED | COLORFILLED SHADOW | COLORFILLED NO SHADOW |
| UNSELECTED | OUTLINED SHADOW | OUTLINED NO SHADOW |

In cases where an unselected feature that is not selectable is touched, a message will be displayed in the programming conflict area 246 of screen 220.

Reproduction machine 5 operates in a variety of operational modes selectable via user interface 213. Any variety of program selections for the reproduction machine 5 can also be selected through user interface 213. Accordingly, reproduction machine 5 is complex and versatile in the jobs which it is capable of performing. In order to realize full and efficient utilization of reproduction machine 5 and to maximize its productivity, the facilitation of tasks required to be performed by a service representative, for example, is provided by the present invention.

The dialogs contain diagnostic information used for a variety of purposes such as: 1) assisting in the isolation of the current problem; 2) recording the performance history; and 3) indicating potential future failures requiring preventive service actions. Machine usage can be tracked to permit analysis of machine feature utilization.

A dialog, e.g., a customer maintenance dialog, can be provided which includes service information, optional maintenance procedures, and operator diagnostic programs which assist an operator in maintaining the machine and preventing unnecessary service calls. A dialog, e.g., a service representative dialog, can be provided which includes service call procedural information, diagnostic programs and repair analysis procedures to assist a service representative in maintaining the machine. The service representative dialog can comprise three dialog modules: 1) service call procedures; 2) diagnostic programs; 3) fault analysis procedures.

The service call procedures dialog module can be provided to assist the service representative while performing maintenance on the system during the service call. The dialog module provides the service representative with all necessary machine fault and history data to organize maintenance activities and identify machine areas requiring attention. The diagnostic programs dialog module enables access to diagnostic programs which reside in the machine. This dialog enables the service representative to execute software diagnostic programs for the printer, scanner, user interface, and electronic subsystem. The diagnostic programs are designed to assist the service representative in diagnosing machine failures and adjusting the system to operating specifications.

The fault analysis dialog module is provided to assist the service representative during isolation of a problem to a failed component. This dialog module comprises a fault analysis entry frame which provides access to a specific repair analysis procedure. The repair analysis procedure is used in conjunction with an information frame, a circuit diagram frame or the diagnostic programs dialog module. The repair analysis procedure presents step-by-step instructions which direct the service representative's fault analysis activity. However, if the service representative is performing fault analysis within the repair analysis procedure dialog, the service representative can independently access functional information within the circuit diagram to determine how the function being checked operates or access the diagnostic programs dialog module to run a diagnostic routine.

Figure 8:
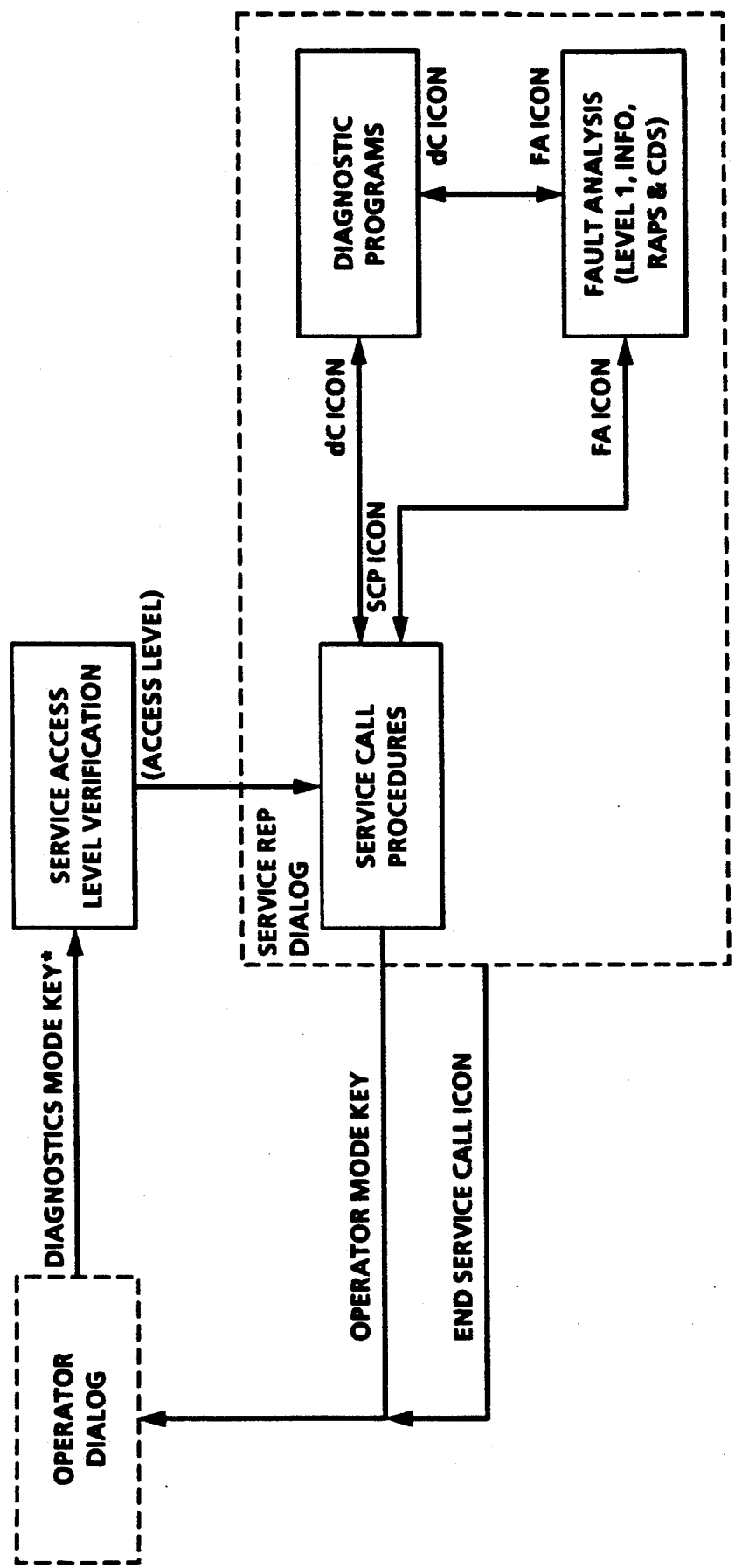
FIG. 8 illustrates the top level structure of a service representative dialog and interconnection between dialog modules.

Access to each of the three dialog modules is provided using the screen-sensitive dialog icons displayed at the top of the service dialog system frame at all times. FIG. 8 depicts the top level structure of the service representative dialog and the interconnection between the dialog modules.

Figure 9:
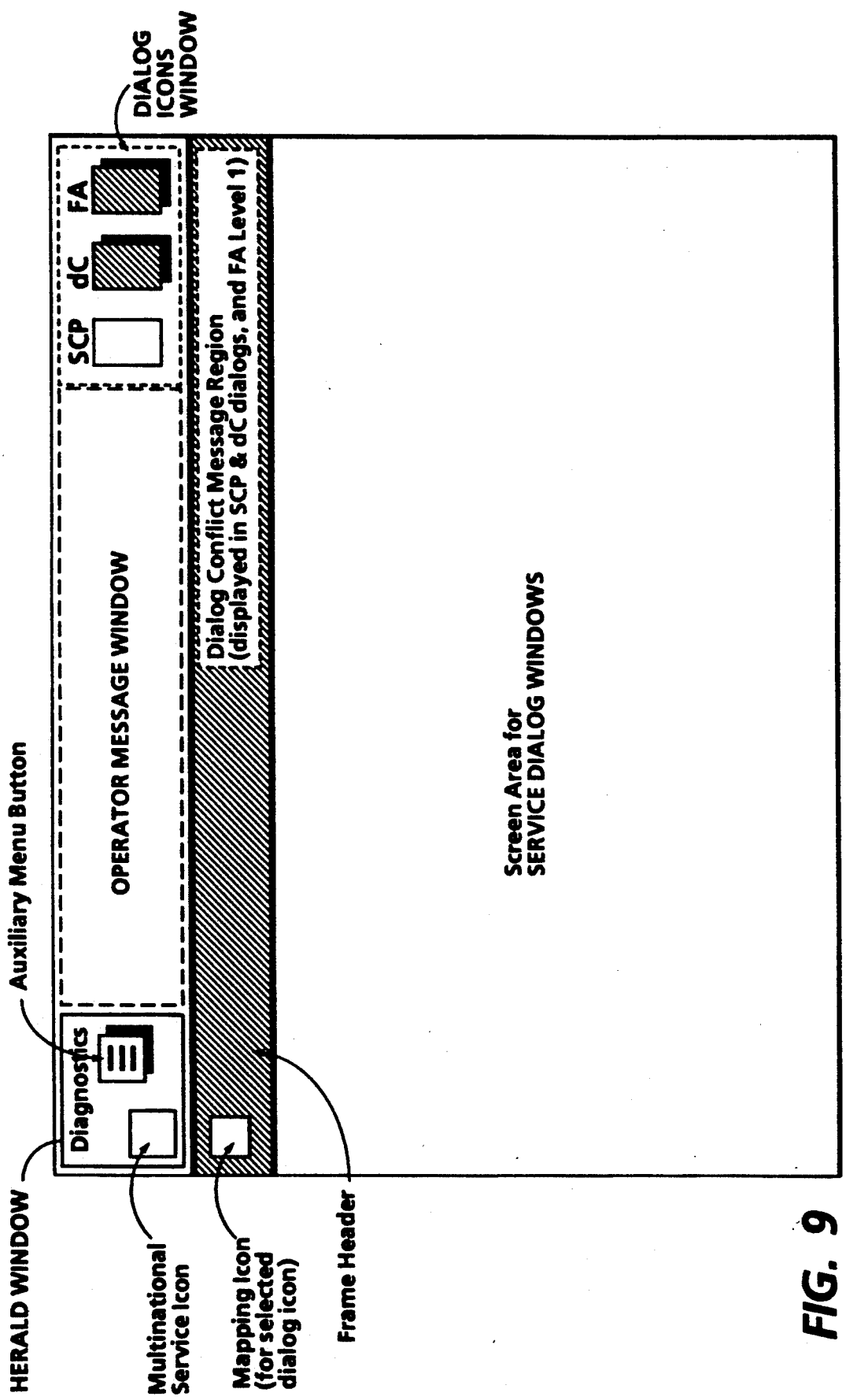
FIG. 9 illustrates major areas of a service dialog system frame.

The service representative dialog frame structure comprises one service dialog system frame which controls the behavior of the dialog windows for the service call procedure, diagnostic program and fault analysis procedure dialog modules. The service dialog system frame represents the total viewing area on the screen. As illustrated in FIG. 9, the system frame is comprised of four major areas: 1) service dialog windows; 2) operator message windows; 3) dialog icons windows; and 4) herald window.

In order to provide the appropriate technical information for the service representative, the service dialog window area uses some form of the score card/work space design for all of the service dialog modules. This window area also contains a dialog conflict message region to display messages when a status or conflict condition occurs during the operation of a diagnostic program or when a dialog feature is selected.

In order to provide system feedback to the service representative during use of the service representative dialog, the operator message window is displayed at the top of the screen at all times. This window region will display operator messages, system status and fault information.

In order to provide access to each of the service representative dialog modules at all times, three screen sensitive icons (one for each dialog module) are displayed in a dialog icons window at the top of the screen. When one of the dialog icons is selected, the dialog that is currently displayed in the targeted window is closed or "put-away" and the new dialog is displayed in its appropriate window.

Figure 10A:
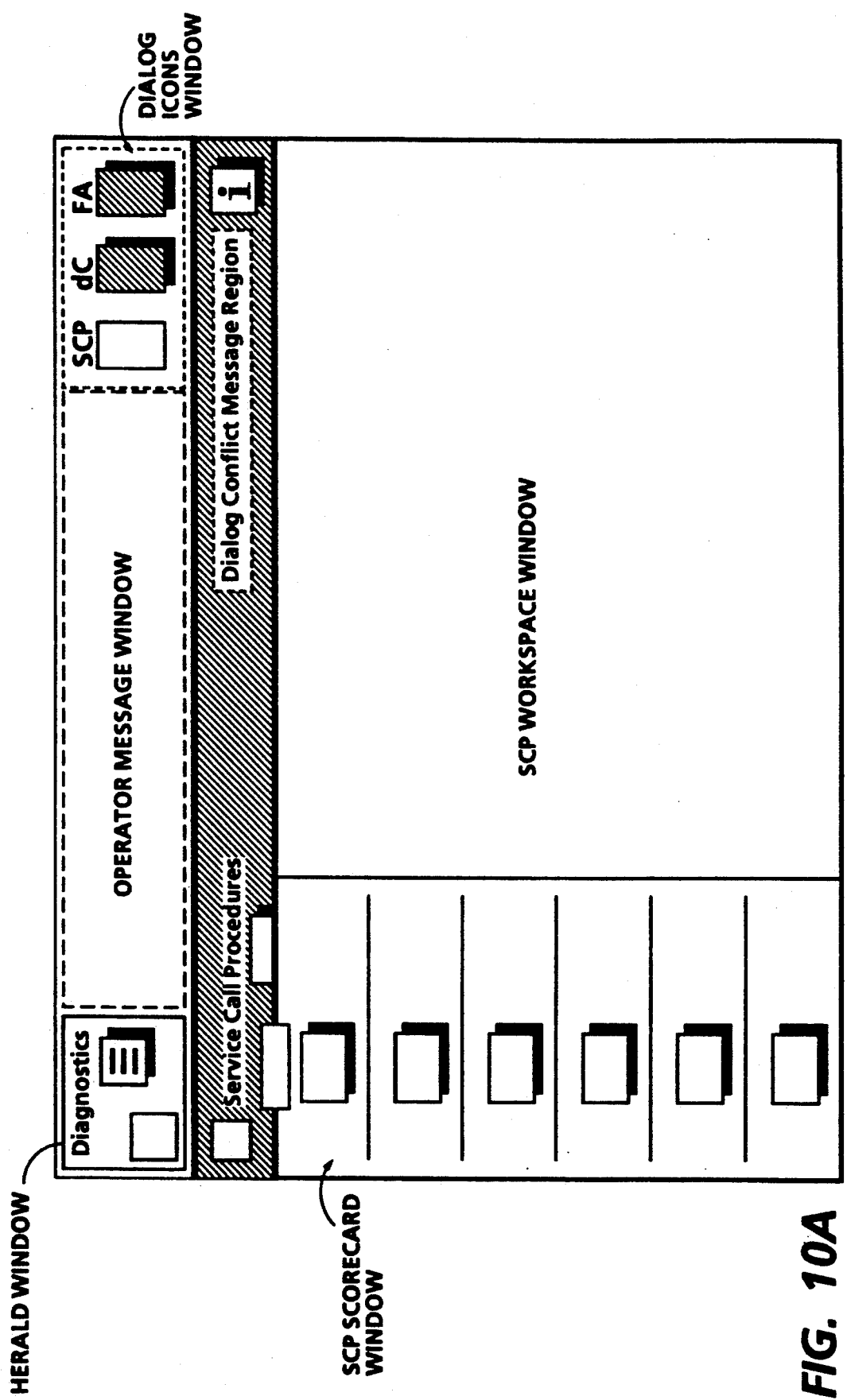
FIGS. 10A-10C illustrate the service call procedures dialog, diagnostic programs dialog and system fault analysis dialog, respectively.
Figure 10B:
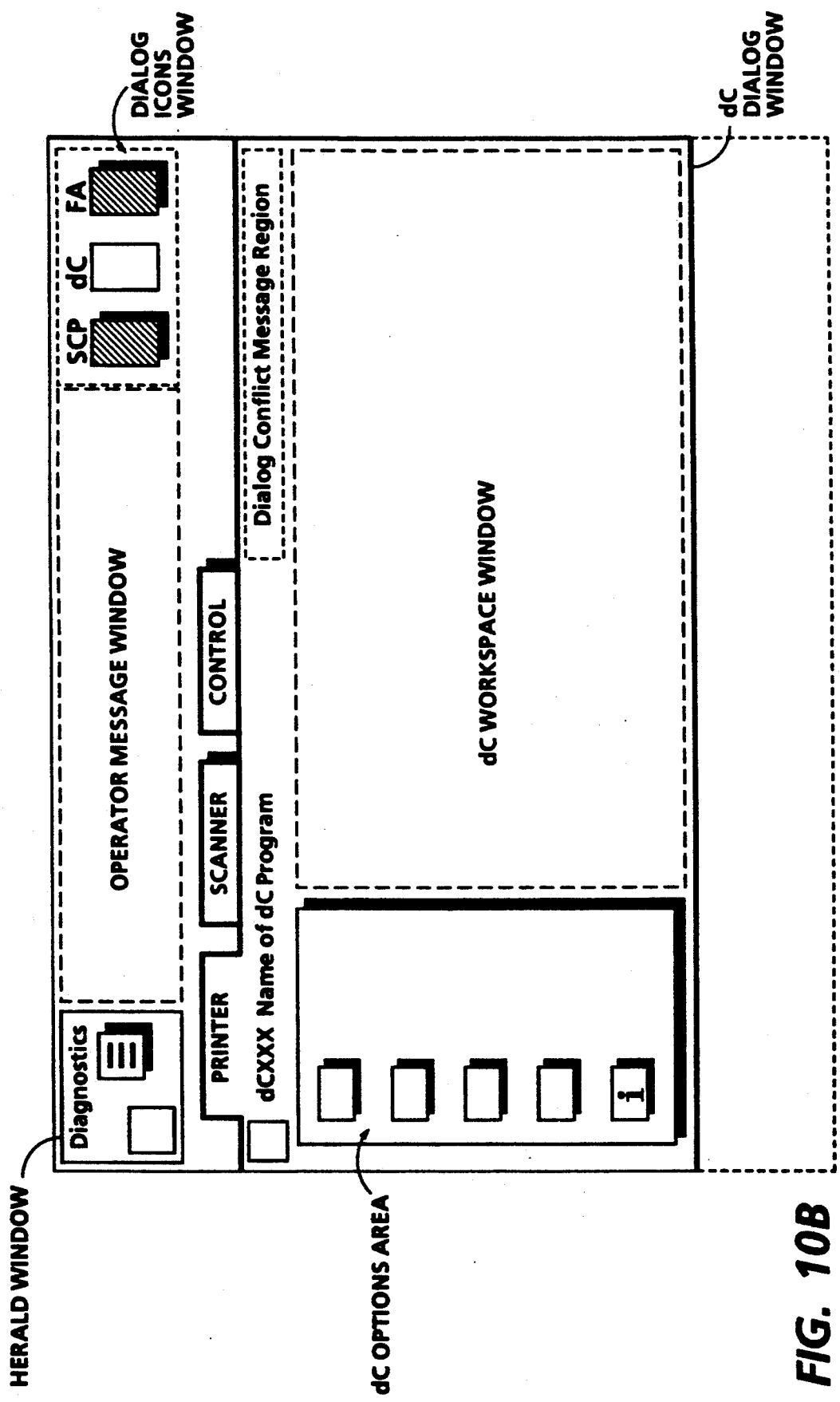
Figure 10C:
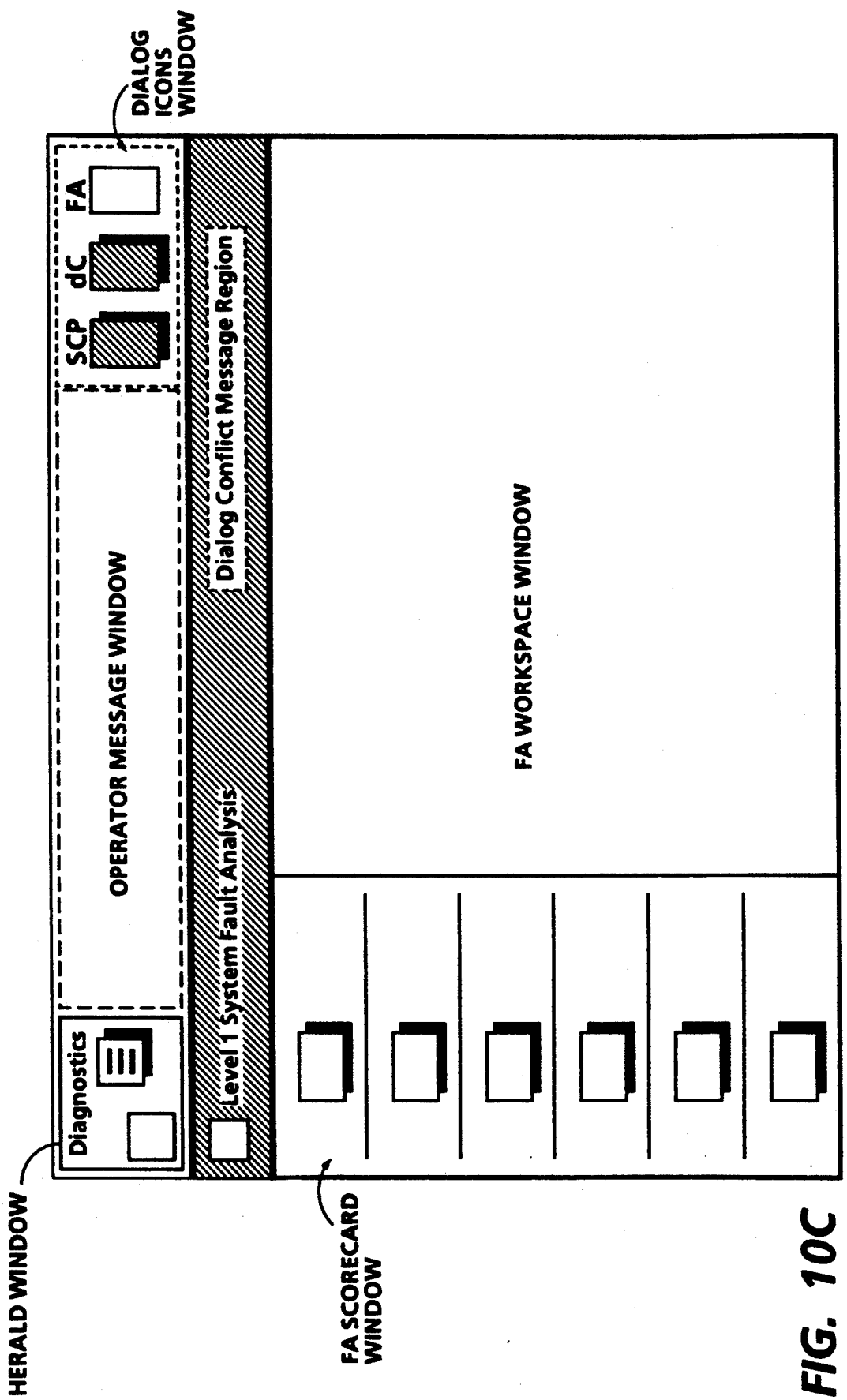

In order to indicate to the service representative that the representative is in the service diagnostics mode, the herald window will display a service icon. The herald window will also contain an auxiliary menu button which will provide access to selections such as: touch enable/disable, printer power on/off, scanner power on/off and system power off. FIGS. 10A, 10B and 10C illustrate the service call procedires dialog, diagnostic programs dialog and system fault analysis dialog, respectively.

Figure 10D:
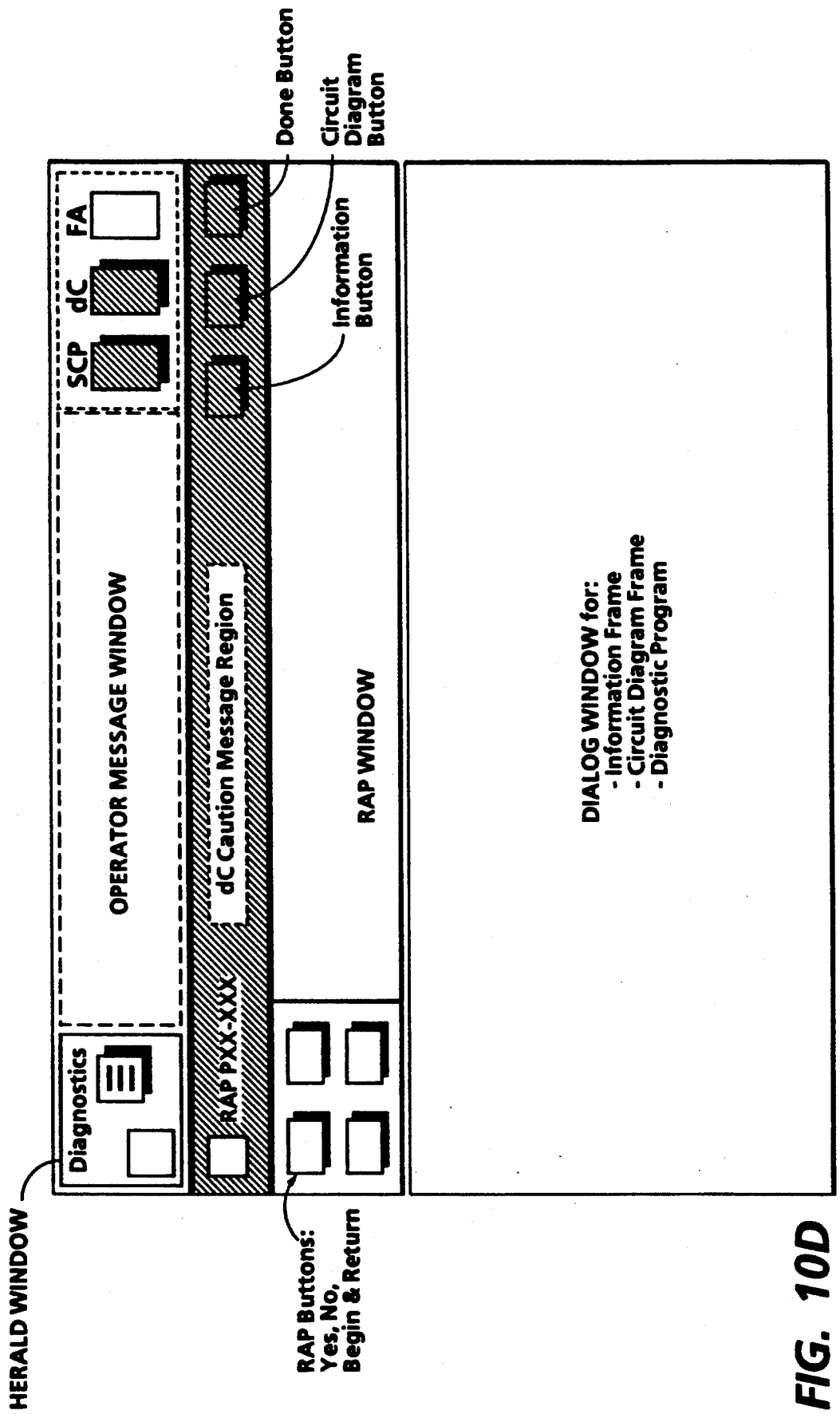
FIG. 10D illustrates windows in the fault analysis dialog.

In the fault analysis dialog, as illustrated in FIG. 10D, there are two dialog windows—a repair analysis procedure window and an information/circuit diagram/diagnostic program window. The repair analysis procedure window will display the appropriate fault isolation instructions for each major fault code condition that can exist in the system. The information/circuit diagram/-diagnostic program window will initially display the appropriate information frame for the repair analysis procedure. If the service representative selects the circuit diagram button, this window will be updated to display the appropriate schematic diagram of the faulty machine area. If the service representative selects the diagnostic (dC) icon, this window will display the appropriate diagnostic program frame. The determination of which diagnostic program frame is displayed and a particular node of the repair analysis procedure will be predetermined based on the task that must be performed for the node.

When the herald window is opened, when the touch enable/disable feature is selected, the system determines whether the touch system is presently enabled or disabled. If the touch system is enabled, the system commands the user interface software to disable touch and to notify the dialog that touch has been disabled. If the touch system is disabled, the system will command the user interface software to enable touch and to notify the dialog that touch has been enabled.

When the printer power on/off feature is selected, the system will determine whether the printer module is presently on or off. If the printer module is on, the system will command the printer to turn off and to notify the dialog that the printer has been powered off. If the printer is off, the system will command the printer to turn on and to notify the dialog that the printer has been powered on. If the printer cannot be powered on or off for some reason, the system will notify the dialog. The auxiliary menu will remain displayed after a selection until notification by the system. The menu window will then be closed and the auxiliary menu button will be changed back to off/not selectable. The scanner power on/off feature operates in the same manner as the printer power on/off feature.

When the system power off feature is selected, a yes/no confirmation menu is displayed. If yes is selected, the system (both the electronic subsystem and the user interface) will be powered off. If no is selected, the auxiliary menu is redisplayed.

In order to provide system feedback to the service representative during use of the service dialog, the operator message window is displayed at the top of the screen at all times. The service dialog uses the message window to display system status information and operator fault messages, display diagnostic system faults for certain diagnostic programs and provide access to fault description and clearance information. The message window displays printer and scanner module icons with their associate status message displayers. The message window also displays an electronic subsystem icon (for system faults) and intercons to notify the operator of tasks that need to be performed. The module icon, if in the on/selectable state, will provide access to the appropriate fault clearance frame, based on the fault code.

The diagnostics programs dialog provides an interface to all diagnostic programs accessible in the system. The diagnostic programs aid the service representative in isolating the cause of a machine malfunction and assists the representative in performing adjustments and machine maintenance. The diagnostic programs dialog is used in conjunction with the repair analysis procedures.

The diagnostic programs dialog is displayed in one dialog window region in the maintenance frame environment or in the bottom dialog window region in the fault analysis frame environment when the diagnostic icon is selected. The dC icon is displayed in the on state, indicating that the dialog is active.

If the dC icon is selected within the maintenance frame environment, the state of the dialog previously displayed in the dialog window region is stored and the diagnostic programs dialog returns to the last diagnostic program menu frame selected. If the diagnostic program's dialog has not been opened, the printer diagnostic program menu is displayed.

If the dC icon is selected within the fault analysis frame environment, the sequence of operation is similar to that which occurs within the maintenance frame environment. The state of the dialog in the bottom window region is stored, and the diagnostic programs dialog displays a specific diagnostic program or the appropriate diagnostic program menu. The repair analysis procedure dialog remains active within the top window region.

Figure 11:
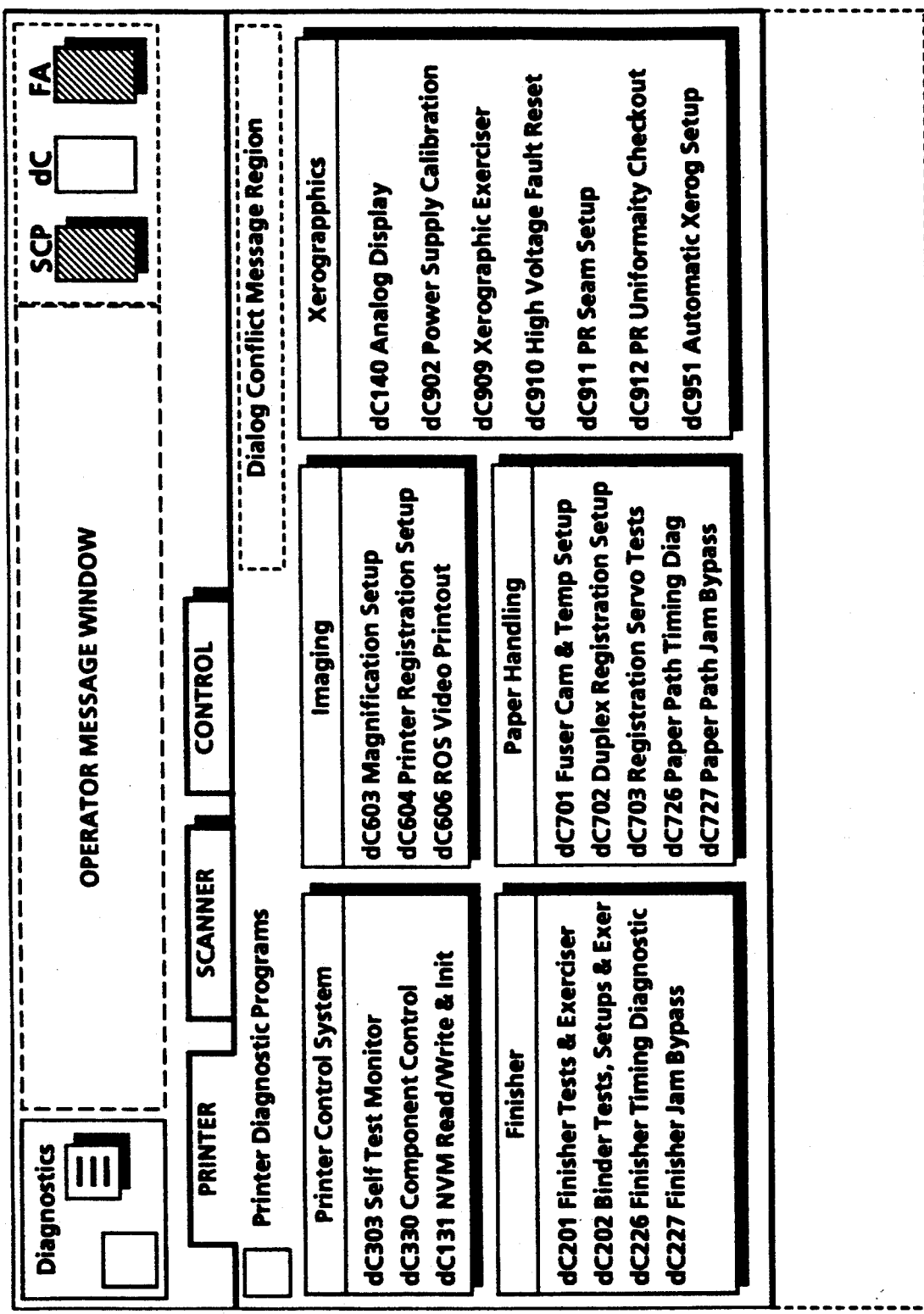
FIG. 11 illustrates a section of the diagnostic programs dialog.

The diagnostic programs dialog is divided into three major sections based on the three modules comprising the system: printer, scanner and control sections. FIG. 11 provides an example of the printer section of the diagnostic programs dialog. The control section includes the electronic subsystem and user interface diagnostics. The screen-sensitive regions are provided in each of the menus to enable the selection of a specific diagnostic program. When a diagnostic programs dialog is selected, the dC dialog window is updated to display the appropriate diagnostic program frame.

Upon selection of a particular diagnostic program frame, e.g., a printer frame, the system enables a service representative to change values of machine set-up non-volatile memory locations, read data counter non-volatile memory locations and read all operating code locations in a control store random access memory.

One level of access for this program can comprise a default level which allows a user to read non-volatile memory locations for the machine's set-up and data counter information, and to write to a limited number of machine set-up locations. Another level of access enables the user to read all operating code locations in a control store random access memory in addition to the non-volatile locations of the first level access. This second level access provides right capability as provided in the first level access. A third level axis provides the same read capability as the second level axis but allows the user to full right capability to all non-volatile memory machine set-up locations. Each access level enables the user to initialize non-volatile memory locations for a specific node to the default values stored in the software. When, for example, the initialized non-volatile memory button and confirmation selections are made in the printer diagnostic program, the system initializes the non-volatile memory values with default settings stored in image output terminal software. The system also notifies the dialog that the node has been initialized.

By interfacing with user interface 213, a service representative can both diagnose malfunctions in the reproduction machine 5 and quickly and easily set-up the reproduction machine 5. During set-up of reproduction machine 5, a non-volatile memory has a parameter provided with a set-up value. A non-volatile memory set-up parameters report contains node number and values of non-volatile memory setpoint locations of a printer electronics data node, marker imaging node, paper handling node and finisher node as well as locations for a scanner machine control board node and scanner image processing node. Previously, the service representative was required to either make a written notation of set-up values of the non-volatile memory for future reference or would have to remember the previous set-up value of the non-volatile memory. In the present invention, a "restore" feature enables the non-volatile memory parameter to be automatically reset to the previous non-volatile memory set-up values. Accordingly, the service representative is prevented from having to make a written notation or remember the previous non-volatile memory set-up values.

The keyboard 300 of user interface 213 enables the service representative to input notes electronically during the course of a service call. The notes input via the keyboard 300 can accordingly be used by the next service representative should a further service call be necessary. Accordingly, the next service representative having to service the machine is enabled immediate access to information regarding the reproduction machine 5 provided during a previous service call.

When a service representative makes a service call, the service representative can select any of a plurality of tasks to be performed. An example of one such task is the reset of high frequency service items. Upon selection of a task by the service representative, a confirm menu can be displayed on display screen 220. The display of the confirm menu enables the service representative to provide confirmation of the task about to be performed. Accordingly, the confirm menu reminds the service representative of the task to be performed.

As described above, a plurality of printed wiring boards contain the LED's and PD's of the display screen 220. The service representative often has to perform diagnostic checks of the PWB's associated therewith to determine, for example, whether the appropriate voltage is provided therein. The present invention provides displays of the PWB blocks on display screen 220 for use by the service representative to determine whether any PWB in the reproduction machine 5 is defective. Accordingly, the display of the PWB blocks prevents the service representative from having to make unnecessary voltage or diagnostic checks.

Reproduction machine 5 contains numerous subcomponents, diagrams of which are generally provided in a service manual. When conducting a service call, a service representative often has to consult the service manual to locate different components in the reproduction machine 5. The display screen 220 of the present invention provides a display of component location diagrams for use by the service representative to locate different components in the machine without having to consult the service manual.

Programming selections for the reproduction machine 5 are selected by a user using either the touch input system 226 described above or a mouse 310 for use as a remote selection device. The service representative can also use the mouse 310 as a remote selection device when the service representative is in a location remote from user interface 213. Accordingly, the mouse 310 can be used as a service diagnostic feature. Touch input system 226 can be selectively disabled when, for example, the service representative is providing maintenance on the reproduction machine 5. Disabling of touch input system 226 can be performed for safety reasons when the service representative is out of sight from the user, thus preventing the user from using the machine while the service representative is providing maintenance. Further, the user can disable touch input system 226 during training or demonstrations.

Due to the complex operation of reproduction machine 5 and the number of components located therein, a variety of repair analysis procedures (commonly 400 plus) are retained for use by a service representative during a service call. The repair analysis procedures are displayed on display screen 220 of user interface 213 as discussed above. Hereinbefore, the service representative kept track of the repair analysis procedures used and selections made to enable the service representative to track backwards if the service representative got lost or needed to return to a specific repair analysis procedure or step. The present invention enables the service representative to track his troubleshooting operation automatically.

Figure 7A:
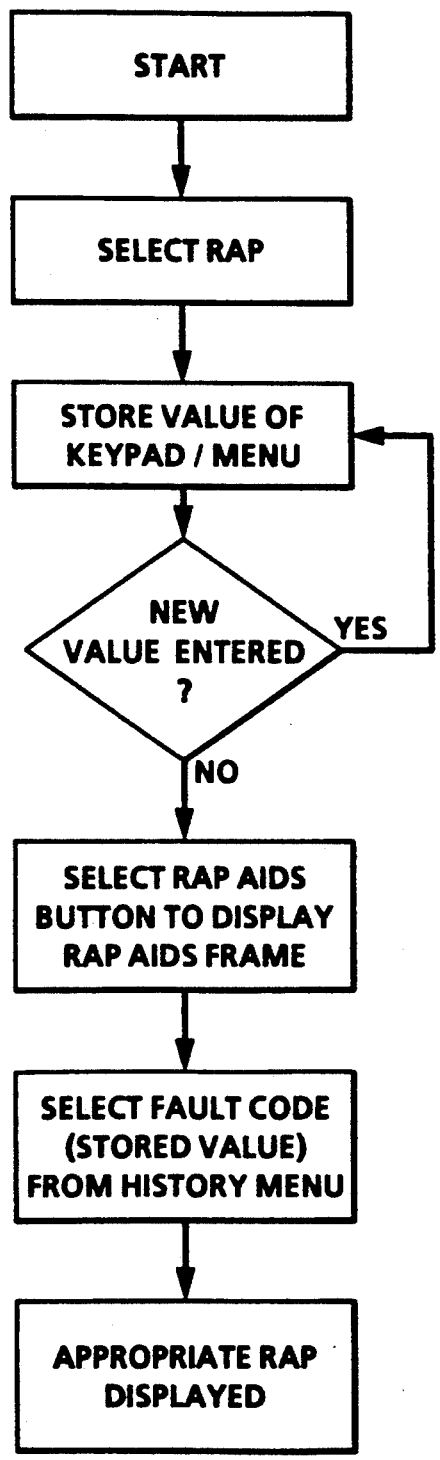
FIGS. 7A and 7B are flowcharts describing the operation of tracking of servicing procedures according to the present invention.
Figure 7B:
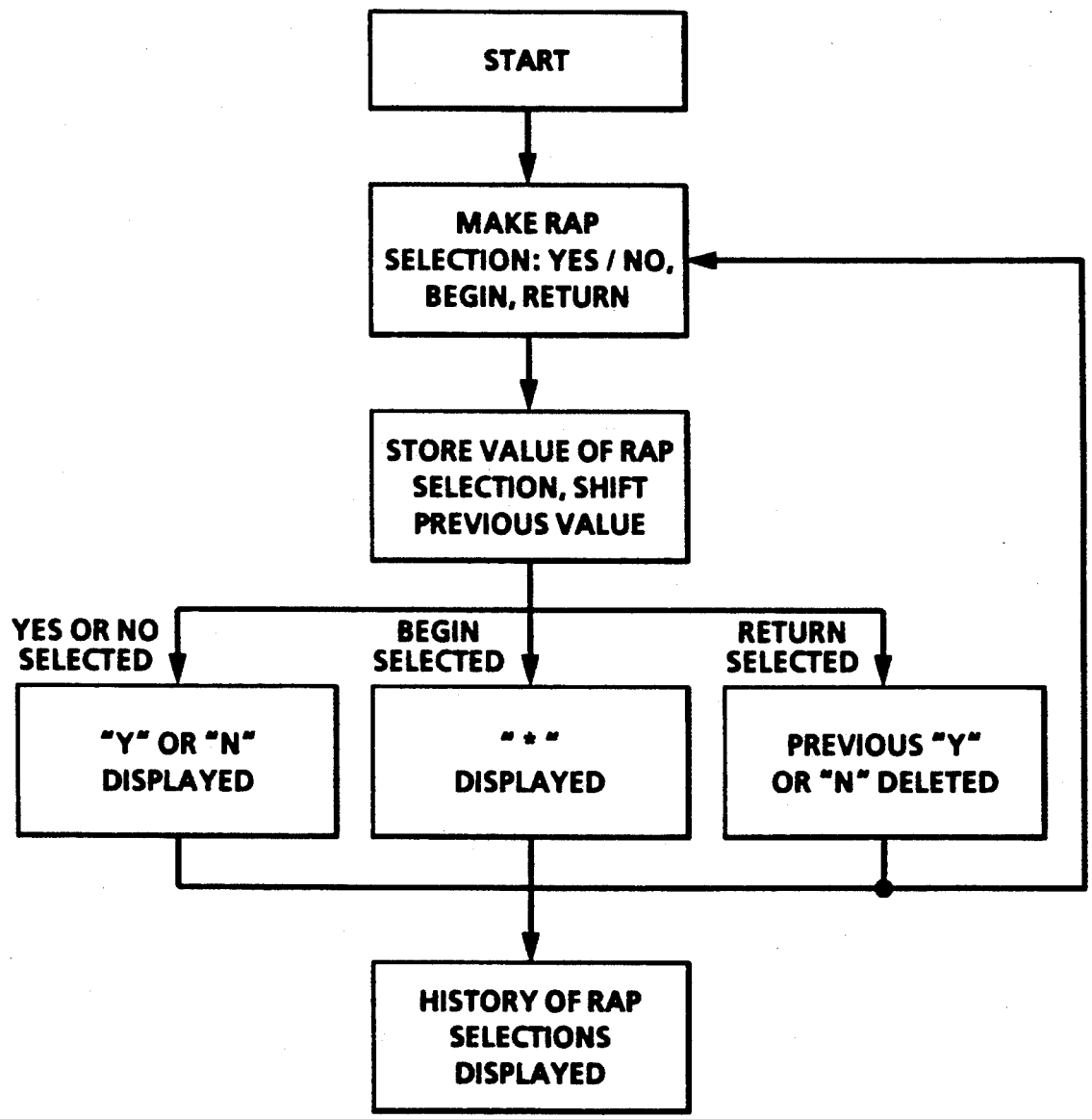

FIG. 7A and 7B illustrate flowcharts describing the basic operation of the automatic tracking of the troubleshooting operation. As illustrated in FIG. 7A, when a repair analysis procedure (RAP) is entered in user interface 213, its value is stored and displayed in a dynamic history-building menu. The storage and display continues until no new RAP values are entered. Upon selection of a RAP aids button, a RAP aids frame is displayed on display screen 220. A fault code stored value is selected from the dynamic history-building menu. The appropriate RAP is then displayed on display screen 220. The service representative is thus able to return at a later time to the appropriate RAP without having to remember which of the numerous RAP's were used during the service call.

As illustrated in FIG. 7B, user interface 213 is provided with a plurality of RAP buttons, i.e., a YES button, a NO button, a Return button and a Begin button. When one of the RAP buttons is selected, its value is stored in the dynamic history-building display. The previous RAP selection value is shifted in storage. If the YES or NO button is selected, a "Y" or "N" is displayed, respectively. If the Begin button is selected, a "*" is displayed on display on 220. If the Return button is selected, the previous "Y" or "N" is deieted. Thereafter, the history of RAP selections can be displayed. This enables the service representative to observe the selections made during the service call. If the service representative feels that a wrong selection was made during the troubleshooting operation of the service call, the service representative is thus able to quickly and easily backtrack. Heretofore, the service representative was required to write the information on a sheet of paper, thus expending additional time during the service call.

In accordance with the above discussion, a service representative making a service call for setting up a reproduction machine or diagnosing malfunctions in the reproduction machine is provided with various aids facilitating the diagnostic process. Because the reproduction machines operate in numerous different manners as a result of machine set-up, programming, etc., the procedures for servicing the machine are no longer so cumbersome since, through the user interface, information about the particular machine is readily provided. The service representative can further input information to the machine as an aid for use during subsequent service calls. Troubleshooting is automatically tracked so that, for example, if the service call is interrupted, the service representative is not required to track backwards to return to a specific servicing procedure.

While this invention has been described in conjunction with specific embodiments thereof, it is evident that many alternative, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A reproduction machine including a user interface for facilitating at least one of diagnosis of malfunctions in the machine and set-up of the machine, said user interface including a display comprising:
   identifying means for identifying a particular defective component; and
   displaying means for displaying at least one of parameters of selected machine components and diagrams of selected machine components on said display, wherein said user interface further includes:
   keyboard means enabling input of information;
   touch responsive means enabling any of a plurality of possible programming selections for the machine to be selected for performance by the machine;
   mouse means enabling remote selection of any of the plurality of possible programming selections;
   selection means for selecting any of a series of servicing procedures for performance during the diagnosis of malfunction in the machine; and
   storage means for storing the selected servicing procedures, wherein said display includes servicing procedure display means for providing a dynamic display of all previously selected servicing procedures so that the servicing procedures performed are readily identified.

2. The reproduction machine according to claim 1, wherein said user interface includes disabling means for disabling said touch responsive means.

3. The reproduction means according to claim 1, wherein said machine components include a plurality of printed wiring boards, said identifying means identifying any of said plurality of printed wiring boards which are defective.

4. The reproduction machine according to claim 1, further comprising a non-volatile memory, said non-volatile memory being provided with a parameter having a set-up value during set-up of the machine, wherein said user interface includes a restore means for restoring the non-volatile memory parameter to a previous value.

5. The reproduction machine according to claim 1, wherein said display includes a confirm menu which is displayed in response to selection of one of said programming selections, said confirm menu providing confirmation of the selected programming selection.

6. The reproduction machine according to claim 1, wherein said servicing procedure display means displays the identity of the servicing procedures in the order in which the servicing procedures were selected.

7. A method of servicing a reproduction machine having a user interface with a display screen, said method comprising performing a plurality of servicing procedures and including:
   a) displaying possible servicing procedures;
   b) selecting one of said servicing procedures;
   c) performing the selected servicing procedure;
   d) determining whether the selected servicing procedure is effective;
   e) selecting another of said servicing procedures and performing said another servicing procedure if said one selected servicing procedure is not effective;
   f) repeating steps d) and e) until one of a desired number of servicing procedures are performed and a servicing procedure is determined to be effective;
   g) storing the identity of each of the selected servicing procedures; and
   h) subsequently displaying all of said selected servicing procedures on said display screen so that steps followed during servicing can be identified.

8. The method according to claim 7, including displaying said selected servicing procedures in selection order.

9. The method according to claim 7, including displaying at least one of a plurality of diagrams of selected machine components on said display screen.

10. The method according to claim 9, including identifying any of said machine components which are defective and displaying the identified machine components on said display screen.

11. The method according to claim 7, including displaying a plurality of programming selections on said display screen and enabling selection of any of said programming selections by operation of at least one of a touch responsive means and a mouse means.

12. The method according to claim 11, including displaying a confirm menu on said display screen in response to selection of any of said programming selections to provide confirmation of the selected programming selection.

13. The method according to claim 7, including storing a parameter having a set-up value during initial set-up of the machine and providing the interface with the capability to automatically reset the parameter to a previous value.

14. A reproduction machine including a user interface having a display screen, said machine comprising:
   first display means for displaying possible servicing procedures on said display screen;
   selection means for selecting one of said servicing procedures;
   servicing procedure performance means for performing the selected servicing procedure;
   storage means for storing the identity of selected servicing procedures; and
   second display means for displaying all of the selected servicing procedures on said display screen so that servicing procedures performed by said servicing procedure performance means are readily identified.

15. The reproduction machine according to claim 14, wherein said second display means displays selected servicing procedures in order of selection.

16. The reproduction machine according to claim 14, wherein said user interface includes machine component display means for displaying diagrams of selected machine components on said display screen.

17. The reproduction machine according to claim 16, further comprising identifying means for identifying any of said machine components which are defective, wherein said machine component display means displays the identified machine components.

18. The reproduction machine according to claim 14, wherein said user interface includes programming selection display means for displaying a plurality of possible programming selections for said machine on said display screen and programming selection means for selecting any of said programming selections.

19. The reproduction machine according to claim 18, wherein said programming selection means comprises at least one of a touch responsive means enabling any of the plurality of possible programming selections to be identified and a mouse means enabling remote selection of any of the plurality of programming selections.

20. The reproduction machine according to claim 19, wherein said user interface includes disabling means for disabling said touch responsive means.

21. The reproduction machine according to claim 18, wherein said user interface includes a confirm menu which is displayed on said display screen in response to selection of one of said programming selections, said confirm menu providing confirmation of the selected programming selection.

22. The reproduction machine according to claim 14, further comprising a non-volatile memory, said non-volatile memory being provided with a parameter having a set-up value during set-up of the machine, said user interface including a restore means which resets the non-volatile memory parameter to a previous value.

23. A method of performing one of diagnosis of malfunctions in a reproduction machine and set-up of the machine, the machine including a user interface having a display, said method comprising:

identifying any of a plurality of machine components which are defective;

displaying diagrams of selected machine components, said selected machine components comprising the machine components identified as defective;

display a plurality of possible programming selections for the machine;

selecting any of the plurality of possible programming selections for performance by the machine;

selecting any of a series of servicing procedures for performance during the diagnosis of malfunctions in the machine;

storing the selected servicing procedures; and displaying all of the selected servicing procedures so that steps followed during servicing are readily identified.

24. The method according to claim 23, including displaying the selected servicing procedures in order of selection.

25. The method according to claim 23, including displaying a confirm menu in response to selection of one of said programming selections to provide confirmation of the selected programming selection.

26. The method according to claim 23, including storing a parameter having a set-up value during initial set-up of the machine and providing the interface with the capability to automatically reset the parameter to a previous value.

* * * * *